(12) United States Patent
Yu et al.

(10) Patent No.: US 10,809,864 B2
(45) Date of Patent: Oct. 20, 2020

(54) FILM TOUCH SENSOR

(71) Applicant: DONGWOO FINE-CHEM CO., LTD., Jeollabuk-do (KR)

(72) Inventors: Byung Muk Yu, Gyeonggi-do (KR); Min Hyuk Park, Gangwon-do (KR); Myung Young An, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 60 days.

(21) Appl. No.: 15/966,106

(22) Filed: Apr. 30, 2018

(65) Prior Publication Data
US 2018/0246603 A1 Aug. 30, 2018

Related U.S. Application Data

(63) Continuation of application No. PCT/KR2016/007861, filed on Jul. 19, 2016.

(30) Foreign Application Priority Data

Nov. 2, 2015 (KR) .................... 10-2015-0152945
Jul. 18, 2016 (KR) .................... 10-2016-0090882

(51) Int. Cl.
 *G06F 3/047* (2006.01)
 *G06F 3/044* (2006.01)

(52) U.S. Cl.
 CPC .............. *G06F 3/047* (2013.01); *G06F 3/044* (2013.01); *G06F 2203/04102* (2013.01); *G06F 2203/04103* (2013.01)

(58) Field of Classification Search
 CPC . G06F 2203/04102; G06F 2203/04103; G06F 3/044; G06F 3/047; G06F 3/0412; G06F 3/041; G02F 1/133502; C09J 4/06; C09J 7/22; B32B 7/02; B32B 27/08; B32B 7/12; H01L 51/5271; H01L 27/3272; H01L 51/0043; G02B 5/3083; G09F 23/00
 See application file for complete search history.

(56) References Cited

U.S. PATENT DOCUMENTS

| | | | |
|---|---|---|---|
| 2002/0180711 A1 | 12/2002 | Umemoto et al. | |
| 2011/0062434 A1* | 3/2011 | Eguchi | H01L 27/3272 257/43 |

(Continued)

FOREIGN PATENT DOCUMENTS

| | | |
|---|---|---|
| JP | 2007-065300 A | 3/2007 |
| JP | 2014-044934 A | 3/2014 |

(Continued)

OTHER PUBLICATIONS

International Search Report for PCT/KR2016/007861.

*Primary Examiner* — Richard J Hong
(74) *Attorney, Agent, or Firm* — The PL Law Group, PLLC

(57) ABSTRACT

A film touch sensor includes a base film, an adhesive layer, a separation layer and a conductive pattern layer, which are sequentially laminated. The base film has a retardation value Ro in a plane direction of 0 to 10 nm, and a retardation value Rth in a thickness direction of −10 to 10 nm. When the film touch sensor is applied to a final product, interference between laminates may be minimized to significantly reduce a change in color sense of an image.

19 Claims, 1 Drawing Sheet

(56) References Cited

U.S. PATENT DOCUMENTS

| | | | |
|---|---|---|---|
| 2013/0241862 A1* | 9/2013 | Kim | C09J 7/22 |
| | | | 345/173 |
| 2014/0333555 A1* | 11/2014 | Oh | G06F 3/044 |
| | | | 345/173 |
| 2015/0027870 A1* | 1/2015 | Yang | G06F 3/041 |
| | | | 200/5 R |
| 2015/0064367 A1* | 3/2015 | Choi | G02F 1/133502 |
| | | | 428/1.31 |
| 2015/0123926 A1 | 5/2015 | Kang et al. | |
| 2015/0363020 A1* | 12/2015 | Chen | G06F 3/044 |
| | | | 345/174 |
| 2016/0152002 A1* | 6/2016 | Inui | B32B 7/02 |
| | | | 428/172 |
| 2016/0178821 A1* | 6/2016 | Choi | G02F 1/133502 |
| | | | 349/194 |
| 2016/0356927 A1* | 12/2016 | Yasui | G02B 5/3083 |
| 2016/0365402 A1* | 12/2016 | Lee | H01L 51/5271 |
| 2016/0370903 A1* | 12/2016 | Hur | G06F 3/044 |
| 2017/0024066 A1* | 1/2017 | Kim | G06F 3/0412 |
| 2017/0080690 A1* | 3/2017 | Ito | G09F 23/00 |
| 2017/0204215 A1* | 7/2017 | Kurimoto | B32B 27/08 |
| 2018/0044552 A1* | 2/2018 | Fujita | C09J 4/06 |
| 2018/0171188 A1* | 6/2018 | Bae | H01L 51/0043 |
| 2018/0267351 A1* | 9/2018 | Yamamoto | B32B 7/12 |

FOREIGN PATENT DOCUMENTS

| | | |
|---|---|---|
| KR | 10-2012-0060995 A | 6/2012 |
| KR | 10-1504535 B1 | 3/2015 |
| KR | 10-2015-0120626 A | 10/2015 |
| TW | 201307073 A | 2/2013 |
| WO | WO 2012/073437 A1 | 6/2012 |

\* cited by examiner

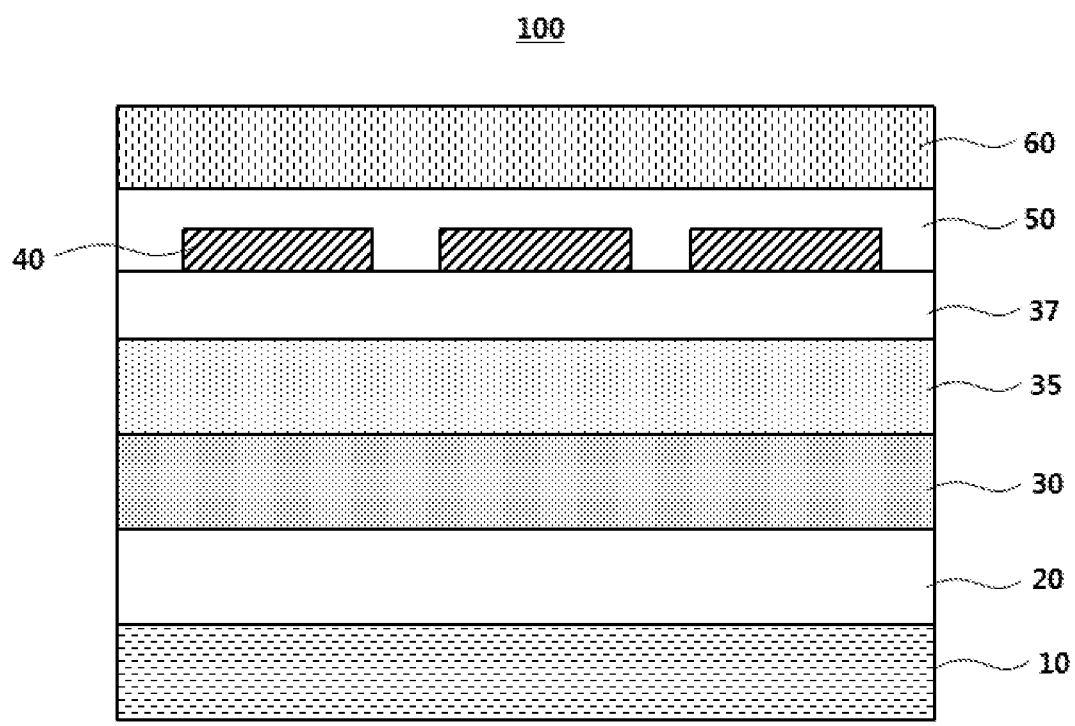

FILM TOUCH SENSOR

CROSS REFERENCE TO RELATED APPLICATIONS AND CLAIM OF PRIORITY

The present application is a continuation application to International Application No. PCT/KR2016/007861 with an International Filing Date of Jul. 19, 2016, which claims the benefit of Korean Patent Application Nos. 10-2015-0152945 filed on Nov. 2, 2015 and 10-2016-0090882 filed on Jul. 18, 2016 at the Korean Intellectual Property Office, the disclosures of which are incorporated by reference herein in their entirety.

BACKGROUND

1. Field of the Invention

The present invention relates to a film touch sensor.

2. Description of the Related Art

Development trend of information display is directed to mobility and convenience in accordance with the mobility of information display terminals such as mobile phones, and PDA from the center of high performance and high function that can realistically represent aspects. Accordingly, there is so much demand for flexible displays having flexibility that is lightweight and may be easily folded so as to be free from restrictions of space and forms thereof.

More particularly, the flexible display refers to a display fabricated using a flexible substrate capable of being bent, or folded, and may be classified into a rugged display, a bendable display, a rollable display depending on the use and function thereof. In addition, the flexible display is a display under development so as to secure applicability to a variety of applications from restrictions of space and forms, by replacing heavy and brittle plate glass which is used in existing flat panel displays (FDPs) such as a thin film transistor (TFT) device substrate for a liquid crystal display (LCD) or an organic light emitting diode (OLED), a color filter substrate, a substrate for a touch screen panel and a substrate for a solar cell with a thin and flexible substrate. Ultimately, continuous research and development on the flexible displays have been actively progressed with the goal of commercialization of a paper-like display capable of being warped.

Meanwhile, a flexible substrate used in such the flexible display is formed in a multi-layer structure, therefore, during displaying an image, image quality may be deteriorated and color sense may be changed due to optical characteristics inherent to each layer.

SUMMARY

Accordingly, it is an aspect of the present invention to provide a film touch sensor which may minimize interference between laminates to significantly reduce a change in reflective color sense of an image when applying to a display.

The above aspect of the present invention will be achieved by one or more of the following features or constructions:

(1) A film touch sensor including: a base film; an adhesive layer; a separation layer; and a conductive pattern layer, which are sequentially laminated, wherein the base film has a retardation value Ro in a plane direction of 0 to 10 nm, and a retardation value Rth in a thickness direction of −10 to 10 nm.

(2) The film touch sensor according to the above (1), wherein the base film has a thickness of 5 to 30 μm.

(3) The film touch sensor according to the above (1), wherein the base film has a water contact angle of 20 to 50°.

(4) The film touch sensor according to the above (1), wherein the base film has a transmittance of 90% or more.

(5) The film touch sensor according to the above (1), wherein the base film includes at least one material selected from a group consisting of polyethyleneetherphthalate, polyethylenenaphthalate, polycarbonate, polyarylate, polyetherimide, polyethersulfonate, polyimide, polyetheretherketone, polyethylene terephthalate, triacetyl cellulose, cyclo-olefin polymer, aramide, FRP, polyurethane, polyacrylate, and polydimethylsiloxane.

(6) The film touch sensor according to the above (1), wherein the adhesive layer has an adhesiveness of 2 N/25 mm or more.

(7) The film touch sensor according to the above (1), wherein the adhesive layer has a chromaticity b* of −1 to +1.

(8) The film touch sensor according to the above (1), wherein the adhesive layer has a transmittance of 95 to 100%.

(9) The film touch sensor according to the above (9), wherein the adhesive layer is formed of a radical-curable adhesive composition.

(10) The film touch sensor according to the above (9), wherein the adhesive layer has an elastic modulus of $1\times10^5$ to $1\times10^9$ Pa.

(11) The film touch sensor according to the above (9), wherein the adhesive layer has an elastic modulus of $1\times10^5$ to $1\times10^7$ Pa.

(12) The film touch sensor according to the above (1), wherein the adhesive layer is formed of a cation-curable adhesive composition.

(13) The film touch sensor according to the above (12), wherein the adhesive layer has an elastic modulus of $1\times10^8$ to $1\times10^{10}$ Pa.

(14) The film touch sensor according to the above (1), wherein the adhesive layer is formed of an adhesive composition including a radical-curable compound and a cation-curable compound.

(15) The film touch sensor according to the above (14), wherein the adhesive layer has an elastic modulus of $1\times10^7$ to $1\times10^9$ Pa.

(16) The film touch sensor according to the above (1), further comprising a first protective layer disposed between the separation layer and the conductive pattern layer.

(17) The film touch sensor according to the above (1), further comprising an optical functional layer disposed on the conductive pattern layer, wherein the optical functional layer includes at least one selected from a group consisting of a retardation film, a polarizer, a cover window film, a scattering-preventive film, and a protective film.

(18) The film touch sensor according to the above (1), further comprising a refractive index matching layer disposed between the separation layer and the conductive pattern layer.

(19) A touch screen panel including the film touch sensor according to any one of the above (1) to (18)

(20) An image display device including the touch screen panel according to the above (19).

The film touch sensor according to the present invention uses the base film having a specific retardation value Ro in a plane direction and a retardation value Rth in a thickness direction, such that interference between laminates may be minimized to significantly reduce a change in black reflective color sense on a front surface and reflective color sense on an inclined surface according to a viewing angle when applying to a display.

BRIEF DESCRIPTION OF THE DRAWINGS

The above and other aspects, features and other advantages of the present invention will be more clearly understood from the following detailed description taken in conjunction with the accompanying drawing, in which:

FIG. 1 is a cross-sectional view schematically illustrating a film touch sensor according to an embodiment of the present invention.

DETAILED DESCRIPTION

It will be understood that when an element such as a layer, film, region, or substrate is referred to as being "on" another element, it can be directly on the other element or intervening elements may also be present.

The present invention discloses a film touch sensor including: a base film; an adhesive layer; a separation layer; and a conductive pattern layer, which are sequentially laminated, wherein the base film has a retardation value Ro in a plane direction of 0 to 10 nm, and a retardation value Rth in a thickness direction of −10 to 10 nm, such that, when applying to a final product, interference between laminates may be minimized to significantly reduce a change in black reflective color sense on a front surface and reflective color sense on an inclined surface according to a viewing angle.

Hereinafter, exemplary embodiments of the present invention will be described in detail with reference to the accompanying drawings. However, since the drawings attached to the present disclosure are only given for illustrating one of various embodiments of present invention to easily understand the technical spirit of the present invention with the above-described invention, it should not be construed as limited to such a description illustrated in the drawings.

FIG. 1 is a cross-sectional view schematically illustrating a film touch sensor 100 according to an embodiment of the present invention.
<Film Touch Sensor>

The film touch sensor 100 according to the present invention has a structure in which a base film 10; an adhesive layer 20; a separation layer 30; and a conductive pattern layer 40 are sequentially laminated.
Base Film 10

The base film 10 according to the present invention has a retardation value Ro in a plane direction of 0 to 10 nm, and a retardation value Rth in a thickness direction of −10 to 10 nm, such that, when applying to a final product, interference between laminates may be minimized to significantly reduce a change in black reflective color sense on a front surface and reflective color sense on an inclined surface according to a viewing angle. For example, the base film 10 has a Ro of 0 to 5 nm, and a Rth of −5 to 5 nm.

If the retardation value Ro in a plane direction of the base film 10 is less than 0 nm or exceeds 10 nm, it is difficult to express the black reflective color sense on the front surface. If the retardation value Rth in a thickness direction is less than −10 nm or exceeds 10 nm, a problem, in which the reflective color sense on the inclined surface according to a viewing angle is red shifted or blue shifted from an original designed color sense, may occur.

For example, the base film 10 has a retardation value Ro in a plane direction and a retardation value Rth in a thickness direction of 0 to 5 nm, respectively, in an aspect of minimizing the above-described problems.

A thickness of the base film 10 is not particularly limited but may be, for example, 5 to 30 µm, and, for another example, 5 to 20 µm. Within the above range, the film touch sensor is suitable for a display having flexibility, and compressive and tensile stresses of an outer portion of a flexible display may be reduced with being folded.

A water contact angle of the base film 10 is not particularly limited but may be, for example, 20 to 50°, and, for another example, 30 to 40°. Within the above range, a composition for forming an adhesive layer may be easily applied during forming the adhesive layer, and adhesion with the base film 10 may be secured.

If the water contact angle of the base film 10 does not satisfy the above range according to a material thereof, additional surface treatment may be performed thereon. For example, saponification treatment, plasma processing, corona treatment, or the like may be executed thereon.

A transmittance of the base film 10 is not particularly limited but may be, for example, 90% or more, and, for another example, 92% or more. Within the above range, when applying to a display, visibility of an image is excellent. Since with the transmittance is superior, the visibility is improved, and therefore, an upper limit of the transmittance is not particularly limited, and may be, for example, 94%, 95%, but it is not limited thereto.

A material of the base film 10 is not particularly limited but may include, for example, polyethyleneetherphthalate, polyethylenenaphthalate, polycarbonate, polyarylate, polyetherimide, polyethersulfonate, polyimide, polyetheretherketone, polyethylene terephthalate, triacetyl cellulose, cyclo-olefin polymer, aramide, FRP, polyurethane, polyacrylate, and polydimethylsiloxane, which may be used alone or in combination of two or more thereof.
Adhesive Layer 20

The film touch sensor according to the present invention may be manufactured by processes of forming a separation layer 30 and a conductive pattern layer 40 to be described below on a carrier substrate, then removing an upper laminate including the separation layer 30 from the carrier substrate, and the base film 10 is finally adhered to the separation layer 30 to be applied to a product. In this case, as a media for adhering the base film 10 to the separation layer 30, an adhesive layer 20 is formed thereon.

The adhesive layer 20 according to the present invention may be made of a curable adhesive composition, and may be made of, for example, a radical-curable composition, a cation-curable composition, or an adhesive composition including a radical-curable compound and a cation-curable compound. In an aspect of securing durability under severe environment through a reduction in corrosiveness, the radical-curable composition may be used.

When the adhesive layer 20 according to the present invention is made of the radical-curable composition, the composition may include a radical photo-initiator, and a photo-polymerizable compound able to be initiated a curing reaction by the radical photo-initiator, but it is not particularly limited thereto.

In addition, when the adhesive layer 20 according to the present invention is made of the radical-curable composition, an elastic modulus of the formed adhesive layer 20 after curing is not particularly limited but may be, for example, $1 \times 10^5$ to $1 \times 10^9$ Pa, and, for another example, $1 \times 10^5$ to $1 \times 10^7$ Pa. Within the above range, a decrease in reliability and a decrease in adhesion inherent to the radical-curable composition may be improved, and the compressive or tensile stresses applied to the conductive pattern layer when bending the film touch sensor may be transferred to the base film to reduce an occurrence of cracks in the conductive pattern layer.

When the adhesive layer 20 according to the present invention is made of the cation-curable composition, the composition may include a cation photo-initiator, and a photo-polymerizable compound able to be initiated a curing reaction by the cation photo-initiator, but it is not particularly limited thereto.

In addition, when the adhesive layer 20 according to the present invention is made of the cation-curable composition, an elastic modulus of the formed adhesive layer 20 after curing is not particularly limited but may be, for example, $1 \times 10^8$ to $1 \times 10^{10}$ Pa. Within the above range, a decrease in an occurrence of cracks in the conductive pattern layer through stress transfer to the base film and a decrease in an occurrence of cracks in the adhesive layer itself may be simultaneously improved.

When the adhesive layer 20 according to the present invention is made of an adhesive composition including the radical-curable compound and the cation-curable compound, the composition may include a radical photo-initiator, a cation photo-initiator, a photo-polymerizable compound able to be initiated a curing reaction by the radical photo-initiator, and a photo-polymerizable compound able to be initiated a curing reaction by the cation photo-initiator, but it is not particularly limited thereto.

When the adhesive layer 20 according to the present invention is made of an adhesive composition including the radical-curable compound and the cation-curable compound, an elastic modulus of the formed adhesive layer 20 after curing is not particularly limited but may be, for example, $1 \times 10^7$ to $1 \times 10^9$ Pa. In this case, a decrease in adhesive properties inherent to the radical-curable compound and an occurrence of cracks due to a high hardness inherent to the cation-curable compound may be simultaneously improved.

An adhesiveness of the adhesive layer 20 according to the present invention is not particularly limited but may be, for example, 2 N/25 mm or more. Within the above range, a sufficient adhesiveness of 4B or more may be maintained between the base film 10 and the separation layer 30 in a cross-cut test (JIS K 5600) of the film touch sensor, thus a damage during treating and assembling the product may be prevented and reliability may be secured. Since with the adhesiveness is increased, an adhesion strength is also increased, an upper limit thereof is not particularly limited.

A chromaticity b* of the adhesive layer 20 according to the present invention is not particularly limited but may be, for example, −1 to +1, and, for another example, 0 to +1. Within the above range, a change in a color coordinate is small when applying to a display.

The transmittance of the adhesive layer 20 according to the present invention is not particularly limited but may be, for example, 95 to 100%, and, for another example, 97 to 100%. Within the above range, visibility of an image may be further improved when applying to a display. Since with the transmittance is increased, the visibility is improved, an upper limit thereof is not particularly limited but may be 100%, or less than 100%.

Separation Layer 30

The separation layer 30 according to the present invention is a layer which is formed to be delaminated from the carrier substrate during the manufacturing process of the film touch sensor, and also plays a role of surrounding the upper conductive pattern layer 40 to insulate the same.

A material of the separation layer 30 according to the present invention is not particularly limited but may be made of, for example, a polymer such as polyimide polymer, poly vinyl alcohol polymer, polyamic acid polymer, polyamide polymer, polyethylene polymer, polystyrene polymer, polynorbornene polymer, phenylmaleimide copolymer polymer, polyazobenzene polymer, polyphenylenephthalamide polymer, polyester polymer, polymethyl methacrylate polymer, polyarylate polymer, cinnamate polymer, coumarin polymer, phthalimidine polymer, chalcone polymer, and aromatic acetylene polymer, which may be used alone or in combination of two or more thereof.

A peel-off strength of the separation layer 30 according to the present invention is not particularly limited but may be, for example, 0.01 to 1 N/25 mm, and, for another example, 0.01 to 0.2 N/25 mm. Within the above range, the separation layer 30 may be easily peeled-off from the carrier substrate without any residue during forming the film touch sensor, and curls and cracks due to a tension generated during peeling-off may be decreased.

A thickness of the separation layer 30 according to the present invention is not particularly limited but may be, for example, 10 to 1,000 nm, and, for another example, 50 to 500 nm. Within the above range, the peel-off strength may be stably maintained, and patterns may be uniformly formed.

Conductive Pattern Layer 40

The conductive pattern layer 40 is formed on the separation layer 30, and includes conductive patterns for serving as electrodes when applying to an electric device.

The patterns of the conductive pattern layer 40 may be formed in a proper shape on demand of the electronic device to be applied. For example, when applying to a touch screen panel, the conductive patterns may be formed in two types of electrode patterns of an electrode pattern for sensing an X coordinate and an electrode pattern for sensing a Y coordinate, but it is not particularly limited thereto.

A compound for forming the patterns is not particularly limited, but in order to prevent the visibility of an image from being deteriorated, transparent material may be used, or formed in micropatterns. Specifically, the compound for forming the patterns may include, for example, indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), metal wire, metal mesh, and the like. These compounds may be used alone or in combination of two or more thereof.

Metals used in the metal wire and metal mesh are not particularly limited but may include, for example, silver (Ag), gold, aluminum, copper, iron, nickel, titanium, tellurium, chromium, and the like, respectively, which may be used alone or in combination of two or more thereof.

In addition, a thickness of the conductive pattern layer 40 is not particularly limited but may be, for example, 0.01 to 5 μm, and, for another example, 0.03 to 0.5 μm.

First Protective Layer 35

As another embodiment of the present invention, the film touch sensor 100 may further include a first protective layer 35 disposed between the separation layer 30 and the conductive pattern layer 40. FIG. 1 schematically illustrates an example of the film touch sensor further including the first protective layer 35.

The first protective layer 35 plays a roll of covering the conductive pattern layer 40 similar to the separation layer 30 to protect the conductive pattern layer 40, and preventing the separation layer 30 from being exposed to an etchant for forming the conductive pattern layer 40 during the manufacturing process of the film touch sensor of the present invention.

Polymers known in the related art may be used for the first protective layer 35 without particular limitation thereof, and the first protective layer 35 may be made of, for example, an organic insulation layer. Among the polymers, the first protective layer 35 may be made of a curable composition containing polyol and melamine curing agents, but it is not limited thereto.

Particular types of the polyol may include polyether glycol derivatives, polyester glycol derivatives, polycaprolactone glycol derivatives, and the like, but it is not limited thereto.

Particular types of the melamine curing agent may include methoxymethyl melamine derivatives, methyl melamine derivatives, butyl melamine derivatives, isobutoxy melamine derivatives, butoxy melamine derivatives, and the like, but it is not limited thereto.

According to another embodiment of the present invention, the first protective layer 35 may be made of organic-inorganic hybrid-curable composition, and when simultaneously using an organic compound and inorganic compound, cracks occurred during peeling-off may be reduced.

The above-described ingredients may be used for the organic compound, and the inorganic compound may include silica nanoparticles, silicon nanoparticles, glass nanofiber, and the like, but it is not limited thereto.

The first protective layer 35 may cover at least a portion on a side of separation layer 30 so as to minimize the side of the separation layer 30 being exposed to the etchant during a process such as patterning of the conductive patterns.

In an aspect of completely shielding the side of the separation layer 30, the first protective layer 35 may cover the entire side of the separation layer 30.

Second Protective Layer 50

According to another embodiment of the present invention, the film touch sensor 100 may further include a second protective layer 50 disposed on the separation layer 30 on which the conductive pattern layer 40 is formed, or on the first protective layer 35.

The second protective layer 50 according to the present invention may be made of an insulation material, and may be formed so as to cover the conductive patterns for electrically isolating the respective patterns of the conductive pattern layer 40 from each other. However, in order to secure an electrical connection space for electrically connecting the conductive patterns with a circuit board, etc., prevent an adhesion failure during adhering the substrate film, secure flexibility, and prevent disconnection of the conductive patterns, the second protective layer 50 may be formed so as to cover a portion or the entire of the conductive patterns.

In addition, the second protective layer 50 may be formed so that a surface thereof opposite to a surface contacting with the conductive patterns is flattened.

The second protective layer 50 may be formed in a single layer or in a plurality of layers of two layers or more.

Any conventional insulation material known in the related art may be used for the second protective layer 50 according to the present invention without particular limitation thereof. For example, the second protective layer 50 may be formed in a desired pattern using a photosensitive resin composition including metal oxide such as silicon oxide or an acrylic resin, or a thermosetting resin composition. Alternately, the second protective layer 50 may be formed using an inorganic material such as silicon oxide ($SiO_x$), and in this case, may be formed by deposition, sputtering methods, and the like.

Optical Functional Layer 60

According to another embodiment of the present invention, the film touch sensor 100 may further include an optical functional layer 60 disposed on the conductive pattern layer 40.

The optical functional layer 60 may be appropriately selected and used according to properties required by the product to be applied, and may include, for example, a retardation film, a polarizer, a cover window film, a scattering-preventive film, and a protective film, but it is not limited thereto.

The optical functional layer 60 of the present invention may be formed in a film type, and then laminated on each other, or may be a coating type formed by applying a composition for forming an optical functional layer to a top of the conductive pattern layer 40 or the second protective layer 50. For example, the second protective layer 50 may be a coating type polarizer, or a coating type retardation layer. When using the coating type optical functional layer, it is determined that the film touch sensor may be further suitable for a display having flexibility or elasticity, in particular, a foldable display or a stretchable display.

If necessary, the film touch sensor 100 of the present invention may further include a refractive index matching layer 37 between the separation layer 30 and the conductive pattern layer 40, or between the first protective layer 35 and the conductive pattern layer 40 when including the first protective layer 35. By including the refractive index matching layer 37, it is possible to prevent the conductive pattern layer 40 from being viewed by a user, and increase visibility of the image to the user, as well as improve the reflective color sense of the image.

Any material known in the related art may be used for the refractive index matching layer 37 without particular limitation thereof. For example, the refractive index matching layer may be an inorganic layer formed by including at least one silicon oxide, metal oxide, and the like, or an organic layer in which light scattering particles are dispersed in a binder resin matrix.

The binder resin matrix is not particularly limited so long as it is a transparent resin, and may include, for example, a photoresist.

The light scattering particle is not particularly limited so long as it is a reflective index adjustable material, and for example, may be at least one inorganic material particles selected from a group consisting of zirconium oxide, zinc oxide, silicon oxide, cerium oxide, indium oxide and titanium oxide.

The refractive index matching layer 37 may have a refractive index of 1.45 to 2.0. If the refractive index of the refractive index matching layer 37 is less than 1.45, effects of improving visibility may not be expressed, and if the refractive index thereof exceeds 2.0, transmittance and Haze may be deteriorated.

The refractive index matching layer 37 may be formed in a single layer or in a plurality of layers of two layers or more, and in an aspect of bending properties, the single layer may be used.

A method of forming the refractive index matching layer 37 according to the present invention may be executed through a simple method of applying a refractive index matching liquid.

The refractive index matching liquid according to the present invention may be a composition for forming a photoresist further including at least one inorganic material particles selected from a group consisting of zirconium oxide, zinc oxide, silicon oxide, cerium oxide, indium oxide and titanium oxide.

The inorganic material may be included in an amount 0.1 to 8 parts by weight ('wt. parts') to 100 wt. parts of the composition for forming a photoresist.

If the inorganic material is included in an amount of less than 0.1 wt. parts to 100 wt. parts of the composition for forming a photoresist, effects of improving visibility may not be expressed, and if the inorganic material is included in an amount of exceeding 8 wt. parts, transmittance may be decreased and Haze may be deteriorated.

The composition for forming a photoresist is not particularly limited so long as it is generally used in the related art, and may be a positive type photoresist or a negative type photoresist.

The refractive index matching layer may be formed by executing any conventional method (for example, an exposing method) of curing the composition for forming a photoresist. In this case, when patterning is required, a process of selectively exposing and etching the layer in a predetermined pattern using a mask may be further executed. The patterning process of the refractive index matching layer may be simultaneously executed with a patterning process (for example, an etching process) of the upper conductive pattern layer.

In addition, the present invention provides a touch screen panel including the above-described film touch sensor. A method of applying the film touch sensor to the touch screen panel may use any method known in the related art without particular limitation thereof.

The touch screen panel according to the present invention may be coupled to an image display device known in the related art. Such the image display device is not particularly limited but may include, for example, a liquid crystal display (LCD), a field emission display (FED), a plasma display panel (PDP), an organic light emitting diode (OLED), or the like.

<Method of Manufacturing a Film Touch Sensor>

Meanwhile, the present invention discloses a method of manufacturing the above-described film touch sensor 100.

The film touch sensor according to the present invention is manufactured through processes of forming an upper laminate such as a separation layer and a conductive pattern layer on a carrier substrate for securing flexibility, and then, removing the carrier substrate.

The method of manufacturing the above-described film touch sensor 100 according to an embodiment of the present invention may be executed by the steps of: applying a composition for forming a separation layer to a carrier substrate to form a separation layer 30; applying a conductive compound on the separation layer 30 to form a film, and performing processes of exposing, developing and etching the same to form a conductive pattern layer 40; peeling-off an upper laminate including the separation layer 30 and the conductive pattern layer 40 from the carrier substrate; and adhering a base film 10 to a bottom of the separation layer 30 through an adhesive layer 20.

More particularly, the composition for forming a separation layer including the above-described ingredients and satisfying the properties after curing is applied to the carrier substrate to form the separation layer 30.

In a case of the composition for forming a separation layer useable in the present invention, the above-described ingredients and contents may be equally selected and used.

Application method of the composition for forming a separation layer is not particularly limited so long as it is generally used in the related art, and may include, for example, a coating method using slit nozzles such as a spray coating, a roll coating, or a discharge coating method using nozzles, etc., a rotation applying method such as a center drop spinning, an extrusion coating, or a bar coating method, etc., which may be used in combination of two or more thereof during coating. After the application, volatile components such a solvent are volatilized by heat drying (freebaking) or vacuum drying then heating the substrate. Herein, generally, heating is performed at a temperature of 80 to 250° C.

The carrier substrate plays a role of a substrate for forming the separation layer 30 thereon, and may use any conventional substrate used in the related art so long as it has a flat surface thereon to uniformly form the separation layer 30, and has a strength to an extent capable of stably performing a lamination process of each layer formed thereon without particular limitation thereof. For example, a glass substrate, a plastic substrate, and the like may be used for the carrier substrate.

Thereafter, a conductive compound is applied to the separation layer 30 to form a film, and processes of exposing, developing and etching the same are performed to form the conductive pattern layer 40.

Types of a conductive compound for forming the conductive pattern layer are not particularly limited, and the above-described ingredients may be equally used.

First, a step of applying the above-described conductive compound may be executed to form a film. The film forming step may be performed by various thin film deposition techniques such as a sputtering, a physical vapor deposition (PVD), or a chemical vapor deposition (CVD) method, or the above-described conventional method, that is, a coating method using slit nozzles such as a spray coating, a roll coating, or a discharge coating method using nozzles, etc., a rotation applying method such as a center drop spinning, an extrusion coating, or a bar coating method, but it is not limited thereto.

Then, in order to form desired patterns, a step of forming a photoresist layer on an upper surface of the conductive compound film may be executed.

A photosensitive resin composition for forming a photoresist layer is not particularly limited, and any photosensitive resin composition typically used in the related art may be used.

After applying the photosensitive resin composition to the film made of the conductive compound, volatile components such a solvent are volatilized by heating and drying, thus providing a smooth photoresist layer.

The photoresist layer obtained as described above is irradiated (exposed) with UV-rays through a mask for forming desired patterns. In this case, in order to uniformly irradiate an entire exposed part with parallel light beams and correctly perform positioning between the mask and the substrate, a device such as a mask aligner or stepper may be used. When irradiating the film with UV-rays, the irradiated portion becomes cured.

Such UV-rays as described above may include g-line (wavelength: 436 nm), h-line, i-line (wavelength: 365 nm), or the like. An amount of UV-ray irradiation may be suitably selected as necessary, but the present invention is not limited thereto.

The photoresist layer prepared after curing may contact with a developing solution to dissolve and develop an unexposed part, thereby forming the desired patterns.

The development method used herein may include any one including liquid addition, dipping, spraying, or the like.

Further, the substrate may be inclined at any angle during developing.

The developing solution is a water-soluble solution containing an alkaline compound and a surfactant, and may use any material generally used in the related art, without particular limitation thereof.

Then, in order to form conductive patterns along the photoresist patterns, an etching process may be executed.

An etchant composition used in the etching process is not particularly limited, and any etchant composition generally used in the related may be used, and, for example, a hydrogen peroxide-based etchant composition may be used.

Through the etching process, the conductive pattern layer 40 including conductive patterns of the desired patterns may be formed.

Next, a step of peeling-off the upper laminate including the separation layer 30 and the conductive pattern layer 40 from the carrier substrate is executed.

The film touch sensor according to the present invention includes the separation layer 30 and the conductive pattern layer 40 satisfying the above-described properties, such that the carrier substrate may be peeled-off without damage or crack.

Finally, the base film 10 is adhered to the bottom of the separation layer 30 through the adhesive layer 20.

The composition for forming the adhesive layer 20 may equally use the above-described ingredients and contents, and the adhesive layer 20 may be made of a composition for forming a photo-curable compound. Therefore, applying the adhesive composition to the top of the base film 10 or the bottom of the separation layer 30, then performing adhering and exposing processes, to prepare the adhesive layer 20. After curing the adhesive layer 20, since the base film 10 satisfies the above-described properties, when applying to a display, the film touch sensor has excellent visibility of an image, and has a proper elastic force, thus very appropriately used in a display having flexibility.

In addition, the base film 10 may also use the above-described materials, and in particular, has a retardation value Ro in a plane direction of 0 to 10 nm, and a retardation value Rth in a thickness direction of −10 to 10 nm, such that, when applying the film touch sensor to a final product, interference between laminates may be minimized to significantly reduce a change in black reflective color sense on the front surface and reflective color sense on the inclined surface according to a viewing angle.

According to another embodiment of the present invention, before forming the conductive pattern layer 40 on the separation layer 30, a process of forming a first protective layer 35 may be further executed, and a composition for forming the first protective layer 35 may equally use the above-described ingredients and contents. An application method thereof may equally use the process of forming the separation layer 30.

According to another embodiment of the present invention, a process of forming a second protective layer 50 on the conductive pattern layer 40 may be further executed, and a composition for forming the second protective layer 50 may equally use the above-described ingredients and contents.

When the second protective layer 50 is made of a resin composition, methods of applying and forming the same may equally use the process of forming the separation layer 30.

When the second protective layer 50 is made of an inorganic material such as silicon oxide (SiOx), the layer may be formed by using various thin film deposition techniques such as a sputtering, a physical vapor deposition (PVD), or a chemical vapor deposition (CVD) method.

According to another embodiment of the present invention, a process of forming an optical functional layer 60 on the conductive pattern layer 40 may be further executed, and types of the optical functional layer 60 may use the above-described materials.

When the optical functional layer 60 is a film type, the optical functional layer 60 may be formed by a process of adhering it to the conductive pattern layer 40 through a binder or adhesive. When the optical functional layer 60 is a coating type, the optical functional layer 60 may be formed by applying a composition for forming an optical functional layer to the top of the conductive pattern layer 40. An application method thereof may equally use the process of forming the separation layer 30.

EXAMPLE

Example 1

A glass carrier substrate (15 cm×10 cm) was coated with cinnamate acrylic polymer in a thickness of 0.13 μm to form a separation layer.

Then, a composition containing polyol and melamine (Aekyung Co., AA2160T) was applied to a top of the separation layer, followed by drying the same to form a first protective layer. Next, an ITO electrode layer was formed thereon through a sputtering method, and finally, an electrode pattering process was performed to prepare a conductive pattern layer.

Then, an acrylic material was applied to the conductive pattern layer and cured to form a second protective layer.

Thereafter, the carrier substrate was peeled-off from an upper laminate (in this case, a peel-off strength of the separation layer is 0.1 N/25 mm), and a saponified triacetyl cellulose substrate film, which includes a radical-curable adhesive composition applied thereon and has a Ro of 1 nm, a Rth of 3 nm, and a thickness of 20 μm, was adhered thereto, then the adhesive was cured by exposing to prepare a film touch sensor. The adhesive layer had a storage modulus of $3 \times 10^6$ MPa at 25° C. after curing.

Example 2

The same procedures as described in Example 1 were conducted to prepare a film touch sensor except that a corona treated cyclo-olefin polymer film having a Ro of 2 nm, a Rth of 1 nm, and a thickness of 13 μm was used as the substrate film.

Example 3

The same procedures as described in Example 1 were conducted to prepare a film touch sensor except that a corona treated polycarbonate film having a Ro of 2 nm, a Rth of 7 nm, and a thickness of 30 μm was used as the substrate film.

Example 4

The same procedures as described in Example 1 were conducted to prepare a film touch sensor except that a cation-curable adhesive composition was used, and the adhesive layer had a storage modulus of $1 \times 10^9$ MPa at 25° C. after curing.

Example 5

The same procedures as described in Example 1 were conducted to prepare a film touch sensor except that an adhesive composition including a cation-curable composition and a radical-curable composition was used, and the adhesive layer had a storage modulus of $2 \times 10^8$ MPa at 25° C. after curing.

Examples 6 to 10

The same procedures as described in Example 1 were conducted to prepare film touch sensors except that a cover window film having a coating type polarizing layer and a coating type retardation layer formed thereon was formed on the electrode pattern layers of Examples 1 to 5, respectively.

Example 11

The same procedures as described in Example 1 were conducted to prepare a film touch sensor except that a corona treated cyclo-olefin polymer film having a Ro of 5 nm, a Rth of −5 nm, and a thickness of 23 μm was used as the substrate film.

Example 12

The same procedures as described in Example 1 were conducted to prepare a film touch sensor except that a saponified triacetyl cellulose film having a Ro of 8 nm, a Rth of −8 nm, and a thickness of 25 μm was used as the substrate film.

Example 13

The same procedures as described in Example 1 were conducted to prepare a film touch sensor except that, after forming a first protective layer, a refractive index matching liquid containing 4 wt. parts of $SiO_2$ and zirconium oxide admixed with each other to 100 wt. parts of a photoresist composition (NT-1200H, Toray Co.) was applied to the first protective layer, then exposed and cured to form a refractive index matching layer, and a conductive pattern layer was formed on the refractive index matching layer.

Comparative Example

Comparative Example 1

The same procedures as described in Example 1 were conducted to prepare a film touch sensor except that a corona treated cyclo-olefin polymer film having a Ro of 20 nm, a Rth of 14 nm, and a thickness of 50 μm was used as the substrate film.

Comparative Example 2

The same procedures as described in Example 1 were conducted to prepare a film touch sensor except that a corona treated polycarbonate film having a Ro of 7 nm, a Rth of 17 nm, and a thickness of 30 μm was used as the substrate film.

Comparative Example 3

The same procedures as described in Example 1 were conducted to prepare a film touch sensor except that a corona treated polymethyl methacrylate film having a Ro of 15 nm, a Rth of −3 nm, and a thickness of 40 μm was used as the substrate film.

Comparative Example 4

The same procedures as described in Example 1 were conducted to prepare a film touch sensor except that a corona treated polymethyl methacrylate film having a Ro of 1 nm, a Rth of −12 nm, and a thickness of 30 μm was used as the substrate film.

Comparative Example 5

The same procedures as described in Example 1 were conducted to prepare a film touch sensor except that a corona treated polyarylate film having a Ro of 2 nm, a Rth of 11 nm, and a thickness of 10 μm was used as the substrate film.

Test Procedure

1. Evaluation of properties of film touch sensor

Properties of the respective layers of the film touch sensors prepared in the examples and comparative examples were evaluated.

(1) Evaluation of Properties of Substrate Film

<Evaluation of Ro and Rth of Substrate Film>

Ro and Rth of the substrate films were measured by an AxoScan (AFM-42H, Axometrics Co.), and the measured values are shown in Table 1 below.

<Evaluation of Water Contact Angle of Substrate Film>

Water contact angles of the substrate films were measured by a contact angle meter (CAM 101, KSV Instrument Co.), and the measured values are shown in Table 1 below.

<Evaluation of Transmittance of Substrate Film>

Transmittances of the substrate films were measured by a UV-visible spectrophotometer (UV-2450, Shimadzu Co.), and the measured values are shown in Table 1 below.

(2) Evaluation of Properties of Adhesive Layer

<Evaluation of Adhesiveness of Adhesive Layer>

Adhesiveness of the adhesive layers with the substrate films was measured according to ASTM standard D1876, respectively, and the measured values are shown in Table 1 below. In this case, a peel-off rate was set to 300 mm/min.

<Evaluation of Elastic Modulus of Adhesive Layer>

Storage modulus of the adhesive layers was measured at respective temperatures by using a viscoelasticity measuring instrument (Dynamic Mechanical Analysis, Keisoku Seigyo Co., Japan, DVA 200). In this case, a deformation mode was set to a strain mode, the number of vibrations was set 10 Hz, a heating rate was set to 10° C./min, and a measurement temperature range was set to −20° C. to 100° C. Storage modulus of each adhesive layer was obtained at 25° C. after measuring, and the measured values are shown in Table 1 below.

<Evaluation of Chromaticity b* of Adhesive Layer>

Chromaticities b* of the adhesive layers were measured by using a WUV-visible spectrophotometer (UV-2450, Shimadzu Co.), and the measured values are shown in Table 1 below.

<Evaluation of Transmittance of Adhesive Layer>

Transmittances of the adhesive layers were measured by using a UV-visible spectrophotometer (UV-2450, Shimadzu Co.), and the measured values are shown in Table 1 below.

TABLE 1

| | Substrate film | | | | | Adhesive layer | | | |
|---|---|---|---|---|---|---|---|---|---|
| Section | Ro (nm) | Rth (nm) | Thickness (μm) | Water contact angle (°) | Transmittance (%) | Adhesiveness (N/25 mm) | Storage modulus (mpa) | Chromaticity b* | Transmittance (%) |
| Example 1 | 1 | 3 | 20 | 25 | 93.3 | 8 | $3 \times 10^6$ | 0.4 | 97.5 |
| Example 2 | 2 | 1 | 13 | 37 | 92.3 | 7 | $3 \times 10^6$ | 0.4 | 97.5 |
| Example 3 | 2 | 7 | 30 | 43 | 90.8 | 5 | $3 \times 10^6$ | 0.4 | 97.5 |
| Example 4 | 1 | 3 | 20 | 25 | 93.3 | 12 | $1 \times 10^9$ | 0.3 | 98.2 |
| Example 5 | 1 | 3 | 20 | 25 | 93.3 | 10 | $2 \times 10^8$ | 0.5 | 97.7 |
| Example 6 | 1 | 3 | 20 | 25 | 93.3 | 8 | $3 \times 10^6$ | 0.4 | 97.5 |
| Example 7 | 2 | 1 | 13 | 37 | 92.3 | 7 | $3 \times 10^6$ | 0.4 | 97.5 |
| Example 8 | 2 | 7 | 30 | 43 | 90.8 | 5 | $3 \times 10^6$ | 0.4 | 97.5 |
| Example 9 | 1 | 3 | 20 | 25 | 93.3 | 12 | $1 \times 10^9$ | 0.3 | 98.2 |
| Example 10 | 1 | 3 | 20 | 25 | 93.3 | 10 | $2 \times 10^8$ | 0.5 | 97.7 |
| Example 11 | 5 | −5 | 23 | 40 | 91.9 | 7 | $3 \times 10^6$ | 0.4 | 97.5 |
| Example 12 | 8 | −8 | 25 | 26 | 92.8 | 7 | $3 \times 10^6$ | 0.4 | 97.5 |
| Example 13 (IML layer) | 1 | 3 | 20 | 25 | 93.3 | 8 | $3 \times 10^6$ | 0.4 | 97.5 |
| Comparative Example 1 | 20 | 14 | 50 | 37 | 92.0 | 7 | $3 \times 10^6$ | 0.4 | 97.5 |
| Comparative Example 2 | 7 | 17 | 30 | 45 | 90.1 | 5 | $3 \times 10^6$ | 0.4 | 97.5 |
| Comparative Example 3 | 15 | −5 | 40 | 32 | 92.4 | 6 | $3 \times 10^6$ | 0.4 | 97.5 |
| Comparative Example 4 | 1 | −12 | 30 | 32 | 92.6 | 7 | $3 \times 10^6$ | 0.4 | 97.5 |
| Comparative Example 5 | 2 | 11 | 10 | 46 | 90.9 | 6 | $3 \times 10^6$ | 0.4 | 97.5 |

2. Evaluation of Reflective Color Sense

The film touch sensors prepared in the examples and comparative examples were adhered to a circular polarizing plate (manufactured according to Korean Patent Laid-Open Publication No. 2015-0109852) to prepare an evaluation specimen.

A color coordinate of the evaluation specimen was obtained by using a DMS 803 (Instrument Systems Co.), and a change in the color coordinate (Δa*b*) on the inclined surface was calculated. The change in the color coordinate was calculated by using $\Delta a^*b^* = \sqrt{(\Delta a^*)^2 + (\Delta b^*)^2}$, and the calculated values are shown in Table 2 below.

In addition, the evaluation specimen was attached to a mirror, and visually observed under a rotating LED 3 band radiation lamp to evaluate a change in black reflective color sense on the front surface and a change in reflective color sense on the inclined surface according to a viewing angle according to the following standards. The evaluated values are shown in Table 2 below.

<Standards for Evaluation of Reflective Color Sense on the Inclined Surface According to a Viewing Angle>
○: no change in color sense
Δ: slightly change in color sense
X: great change in color sense

TABLE 2

| | Evaluation of black reflective color sense on the front surface | Evaluation of reflective color sense on the inclined surface | |
|---|---|---|---|
| Section | | Evaluation | Change in color coordinate (Δ a*b*) |
| Example 1 | Black | ○ | 9 |
| Example 2 | Black | ○ | 5 |
| Example 3 | Black | ○~Δ | 16 |
| Example 4 | Black | ○ | 9 |
| Example 5 | Black | ○ | 9 |
| Example 6 | Black | ○ | 9 |
| Example 7 | Black | ○ | 5 |
| Example 8 | Black | ○~Δ | 16 |
| Example 9 | Black | ○ | 9 |
| Example 10 | Black | ○ | 9 |
| Example 11 | Black | ○ | 16 |
| Example 12 | Blackish | ○~Δ | 17 |
| Example 13 | Black | ○ | 9 |
| Comparative Example 1 | Bluish | X | 25 |
| Comparative Example 2 | Blackish | X | 30 |
| Comparative Example 3 | Bluish | ○ | 16 |
| Comparative Example 4 | Black | X | 22 |
| Comparative Example 5 | Black | X | 22 |

Referring to Table 1, it can be seen that the film touch sensors of the examples had significantly excellent evaluated results in terms of a change in black reflective color sense on the front surface and a change in reflective color sense on the inclined surface according to a viewing angle compared to the film touch sensors of the comparative examples. In particular, it can be seen that the film touch sensor of example 13 exhibited the same level as that of Example 1 in terms of reflective color senses on the front surface and on the inclined surface, and exhibited more improved visibility of patterns than Example 1.

The film touch sensor of Comparative Example 3 had the reflective color sense on the inclined surface similar to some of the film touch sensors of the examples, however exhibited significantly deteriorated black reflective color sense on the front surface compared to the examples.

The present technology can be embodied and practiced in other different forms without departing from the gist and essential characteristics thereof. Therefore, the above-described embodiments are considered in all respects as illustrative and not restrictive. The scope of the technology is indicated by the appended claims rather than by the foregoing description. All variations and modifications falling within the equivalency range of the appended claims are intended to be embraced therein.

What is claimed is:

1. A film touch sensor comprising:
a base film having a retardation value Ro in a plane direction of 0 to 10 nm, and a retardation value Rth in a thickness direction of −10 to 10 nm;
an adhesive layer formed directly on the base film;
a separation layer formed directly on the adhesive layer;
a conductive pattern layer formed on the separation layer; and
a first protective layer disposed between the separation layer and the conductive pattern layer, the first protective layer being an insulation layer entirely covering a top surface of the separation layer, the first protective layer being an organic layer comprising a polymer, the first protective layer is not in contact with the adhesive layer.

2. The film touch sensor of claim 1, wherein the base film has a thickness of 5 to 30 μm.

3. The film touch sensor of claim 1, wherein the base film has a water contact angle of 20 to 50°.

4. The film touch sensor of claim 1, wherein the base film has a transmittance of 90% or more.

5. The film touch sensor of claim 1, wherein the base film includes at least one material selected from the group consisting of polyethyleneetherphthalate, polyethylenenaphthalate, polycarbonate, polyarylate, polyetherimide, polyethersulfonate, polyimide, polyetheretherketone, polyethylene terephthalate, triacetyl cellulose, cyclo-olefin polymer, aramide, FRP, polyurethane, polyacrylate, and polydimethylsiloxane.

6. The film touch sensor of claim 1, wherein the adhesive layer has an adhesiveness of 2 N/25 mm or more.

7. The film touch sensor of claim 1, wherein the adhesive layer has a chromaticity b* of −1 to +1.

8. The film touch sensor of claim 1, wherein the adhesive layer has a transmittance of 95 to 100%.

9. The film touch sensor of claim 1, wherein the adhesive layer is formed from a radical-curable adhesive composition.

10. The film touch sensor of claim 9, wherein the adhesive layer has an elastic modulus of $1 \times 10^5$ to $1 \times 10^9$ Pa.

11. The film touch sensor of claim 9, wherein the adhesive layer has an elastic modulus of $1 \times 10^5$ to $1 \times 10^7$ Pa.

12. The film touch sensor of claim 1, wherein the adhesive layer is formed of a cation-curable adhesive composition.

13. The film touch sensor of claim 12, wherein the adhesive layer has an elastic modulus of $1 \times 10^8$ to $1 \times 10^{10}$ Pa.

14. The film touch sensor of claim 1, wherein the adhesive layer is formed of an adhesive composition including a radical-curable compound and a cation-curable compound.

15. The film touch sensor of claim 14, wherein the adhesive layer has an elastic modulus of $1 \times 10^7$ to $1 \times 10^9$ Pa.

16. The film touch sensor of claim 1, further comprising an optical functional layer disposed on the conductive pattern layer,
wherein the optical functional layer includes at least one selected from the group consisting of a retardation film, a polarizer, a cover window film, a scattering-preventive film, and a protective film.

17. The film touch sensor of claim 1, further comprising a refractive index matching layer disposed between the separation layer and the conductive pattern layer.

18. A touch screen panel comprising the film touch sensor of claim 1.

19. An image display device comprising the touch screen panel of claim 18.

* * * * *